Inventor;
Lyman F. Whitney,
by Roberts, Cushman & Woodbury Att'ys.

Jan. 27, 1942.   L. F. WHITNEY   2,271,449
WATER HEATING APPARATUS
Filed Feb. 24, 1938   5 Sheets-Sheet 2

Inventor
Lyman F. Whitney,
by Roberts, Cushman & Woodbury Attys.

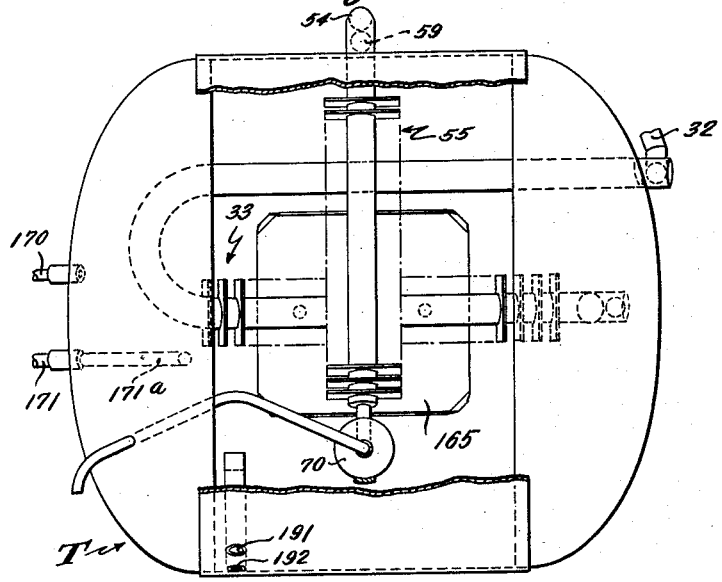
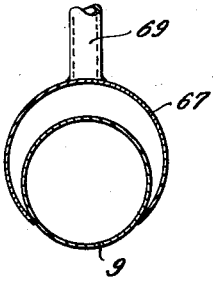
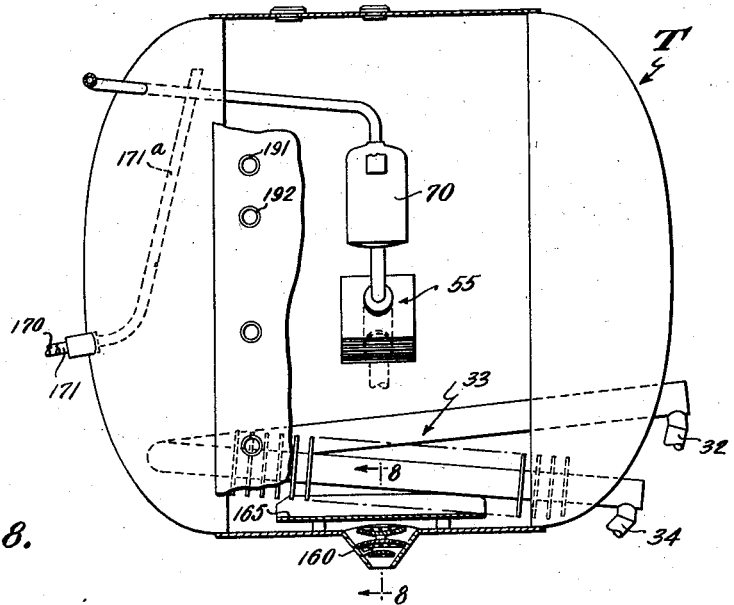
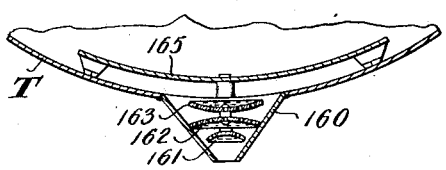

Jan. 27, 1942.   L. F. WHITNEY   2,271,449
WATER HEATING APPARATUS
Filed Feb. 24, 1938   5 Sheets—Sheet 4
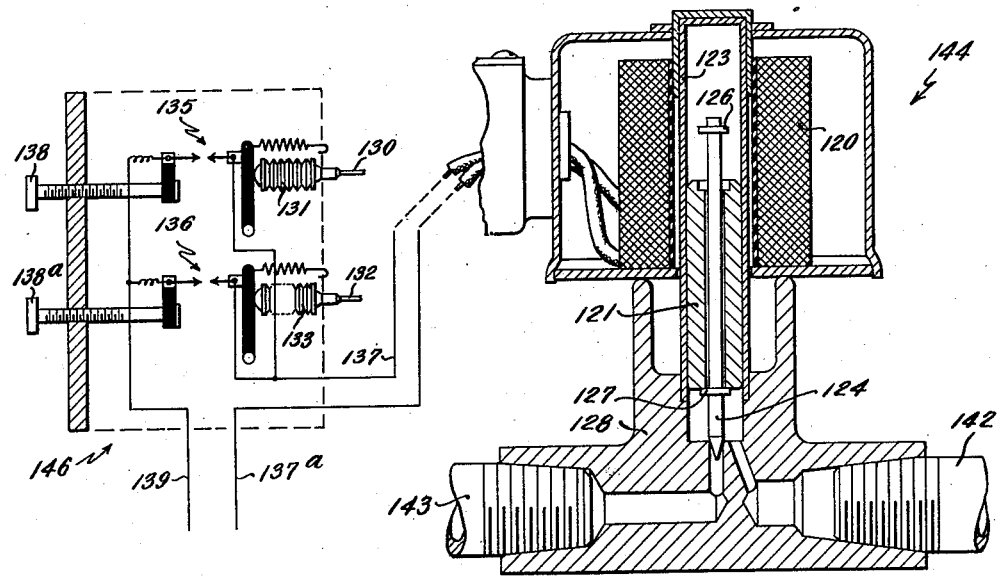
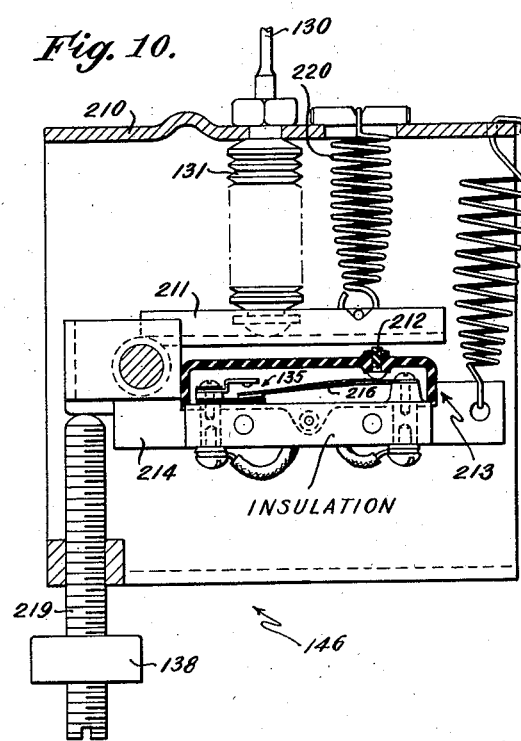
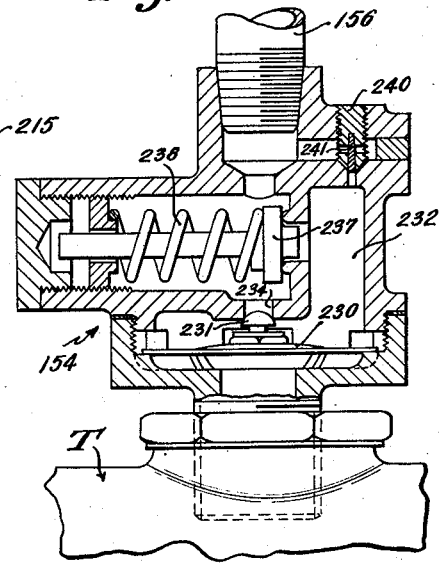
Inventor,
Lyman F. Whitney,
by Roberts, Cushman & Woodbury
Attys.

Jan. 27, 1942.  L. F. WHITNEY  2,271,449
WATER HEATING APPARATUS
Filed Feb. 24, 1938  5 Sheets-Sheet 5
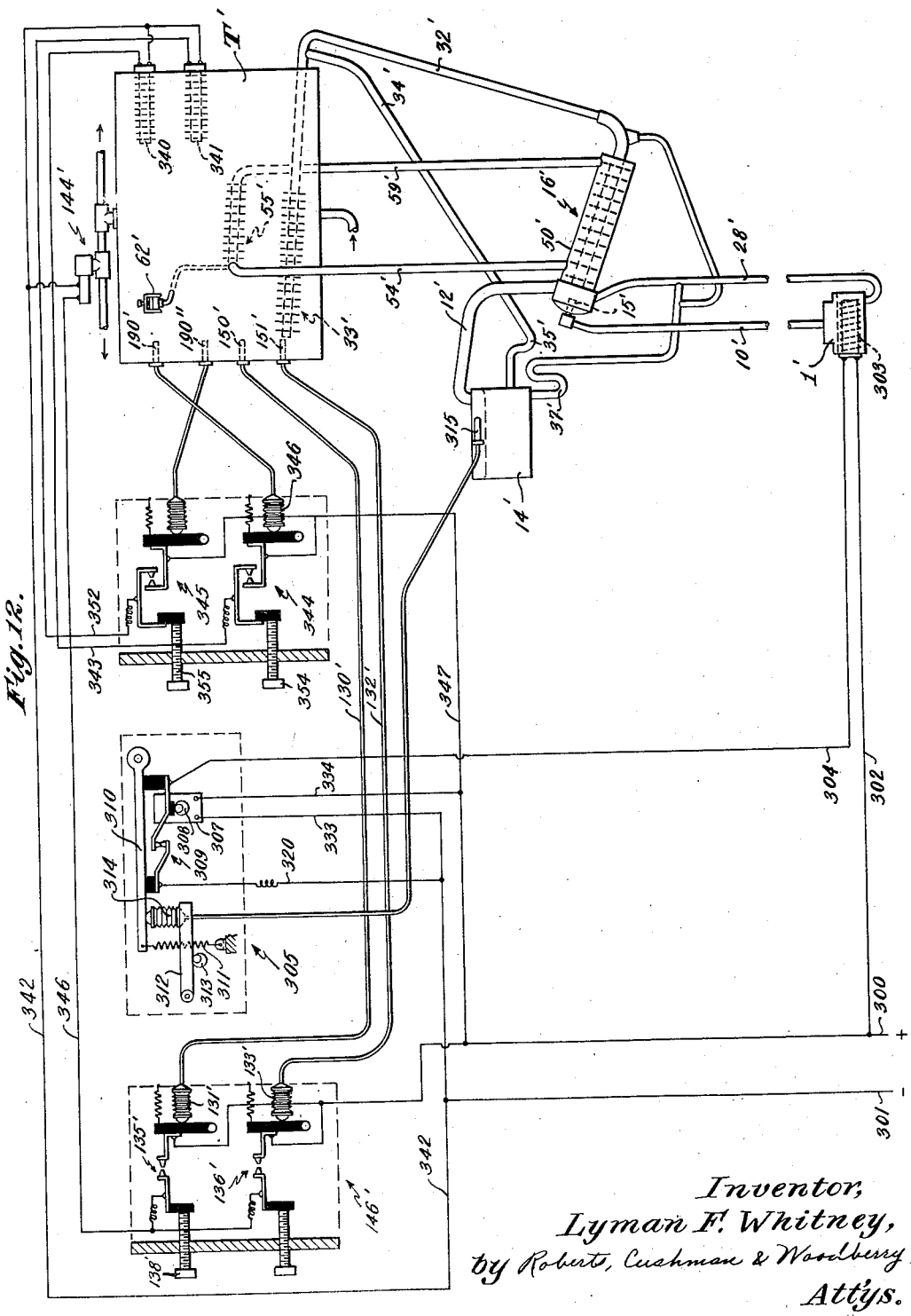
Inventor,
Lyman F. Whitney,
by Roberts, Cushman & Woodbury
Attys.

Patented Jan. 27, 1942

2,271,449

UNITED STATES PATENT OFFICE 2,271,449

WATER HEATING APPARATUS

Lyman F. Whitney, Cambridge, Mass., assignor, by mesne assignments, to Stator Corporation, a corporation of Rhode Island Application February 24, 1938, Serial No. 192,343

32 Claims. (Cl. 62—115)

This invention relates to an improved water heating apparatus and to such apparatus including a refrigerating system; the invention also involves an improved method of conjointly providing refrigeration and heating water.

The present invention more particularly provides apparatus for heating water to a temperature sufficiently high for ordinary household purposes, such as washing dishes and clothes. Part of the heat supplied to the hot water may be received from the evaporator of a refrigerating system which may provide useful refrigeration, as in a household refrigerator, or which may be employed for water heating purposes alone.

Apparatus providing both household refrigeration and hot water should be capable of meeting widely varying conditions of refrigeration demand and independently varying conditions of hot water demand. Both over-cooling of the refrigerator and over-heating of the water should be avoided, while the operating conditions and temperatures should be so correlated that satisfactory refrigeration and water heating may be afforded without unnecessary losses.

The refrigerating system preferably may include at least one portion that can emit a substantial quantity of heat at a temperature at least of the order of 150° F. Aside from such a high temperature heat dissipator, the system may also include a warm dissipator. Both dissipators preferably should function so that suitable temperature differentials are maintained between them and the stored water even when refrigeration demand is low and the mean temperature of the stored water is relatively high, while unnecessarily high temperatures should be avoided when this mean temperature is relatively low.

To permit these desirable results, the refrigerating system may preferably be of the heat-operated type, such as an aspirator or absorption system. The heater preferably may be controlled by a thermostatic device responsive to the temperature of the refrigerated region, but this device may function to cause more heat to be supplied by the heater in response to an increase in the temperature of water receiving heat from either dissipator. Thus a continuing uniform refrigerating demand may be met while the operating temperatures of the dissipators are being increased, so that the heat from the refrigerating cycle may continue readily to pass into the water. Under such conditions more heat may be supplied either by causing the operation of an intermittently operating heater for a greater fraction of the total elapsing time or by supplying heat at a higher rate from a continually operating heater.

In order to prevent over-heating of the water when, for example, water is not withdrawn for household used during a period of substantial length, the apparatus is provided with control means associated with a suitable dump valve for emitting water. The control means is effective in causing operation of the dump valve when the temperature of the major portion of the stored water exceeds a predetermined temperature which preferably is substantially above the temperature necessary for hot water for household uses. Thus the dump valve may operate automatically when the temperature of the major portion of the water reaches substantially 170° F. The temperature-responsive control means and dump valve are so arranged that only a minor fraction of the stored water is automatically emitted under such conditions.

In order to permit effective operation of the dump valve and control means in this manner, the water storage system, e. g., the water tank, may be arranged so that stratification of the water is effected, the hotter water being in a hot zone at the upper part of the tank, this zone having a rather sharply defined lower border with a steep temperature gradient. The temperature-responsive device may be disposed in the region of this border layer. When the temperature of the adjoining water reaches a predetermined point, the temperature-responsive device acts to emit water from the hot zone, whereupon the border of the hot zone moves upwardly away from the temperature-responsive device, so that the latter is almost immediately subjected to a much lower temperature and thus closes the valve after only a relatively small amount of water has been emitted. Cold water is admitted to the bottom of the tank whenever hot water is emitted. The stratification means is arranged to prevent incoming cold water from mixing with the hot water.

The heater may be in the form of a continuously operating burner. Fuel, such as gas, may be supplied to such a burner at a rate which varies in response to refrigeration demand. Even at the minimum rate of gas supply (as when the refrigerator is being defrosted) more heat preferably may be supplied to the water than is being lost by radiation and convection from the water storage system. For example, under ordinary operating conditions, the rate of gas supply may be more than 40% of the maximum rate. The constantly operating burner may thus cause a gradual increase in the mean temperature of the stored water at a rate of less than 10° F. per hour, as long as no water is withdrawn from the storage system.

The water may be gradually heated for a period of substantial length without necessity for dumping water. Thus, for example, under many conditions of use the water may be heated overnight without operation of the dump valve. On the other hand, if hot water is not drawn from the system during a relatively long period, the dump valve occasionally acts to emit hot water, thus to prevent overheating of the stored body of water.

When a large amount of hot water is withdrawn from the storage system, an intermittently operating auxiliary heater or booster burner may be started to supply heat at a relatively high rate until water in the upper part of the tank is heated to a predetermined point. Thereupon operation of the auxiliary heater is automatically terminated. The accurate control of the auxiliary heater under such conditions is aided by the stratification means.

In order to permit maximum efficiency if the refrigerating system is provided with two dissipators, the latter may be arranged normally to function at different operating temperatures, the high temperature dissipator being located above the warm dissipator. Thus heat from the high temperature dissipator may be received by water in the upper hot zone, and the heat from the low temperature dissipator may be received by water in a warm zone below the hot zone.

When an arrangement of this character is employed, one of the dissipators, and preferably the high temperature dissipator, may preferably be in the form of a condenser which is part of an auxiliary fluid system providing intermediate means to transfer heat from a relatively hot part of the refrigerating system to the stored water. Such a fluid system is particularly advantageous when the design of the refrigerating system makes it desirable for the high temperature portions thereof to be located below the upper part of the apparatus. The warm dissipator may be the refrigerant condenser which may in many cases be located at or adjoining the upper part of the refrigerating system and which can conveniently be located in direct heat transfer relation to the stored water. When two heat dissipators are associated with the storage system in this manner, the dump valve means preferably is controlled by two temperature-responsive devices so that overheating of water adjoining either of the dissipators is effectively prevented.

In the preferred embodiment of the invention, the auxiliary fluid system may contain a fluid such as alcohol which has a boiling point substantially below the boiling point of water and which is non-corrosive. The effective boiling point of the fluid may, moreover, be decreased by evacuation of the auxiliary system. Such evacuation permits the more ready vaporization of the auxiliary fluid and the more convenient and effective transfer of heat to the stored hot water and also results in the romoval of water vapor from the auxiliary system, thus precluding corrosion and the resulting generation of non-condensable gases in the system.

The combined refrigerating and water heating system may also include an economizer to receive heat from the stack if a combustible fuel is being burned. Such an economizer may conveniently form part of the auxiliary fluid system.

Further features of the invention relate to the arrangement of the auxiliary heater and the incorporation as a part of the unitary apparatus.

In the accompanying drawings:

Fig. 5 is a plan view of the water tank, a part being broken away and shown in section;

Fig. 6 is a similar rear elevation of the tank;

Fig. 7 is a sectional detail of the stack and associated economizer;

Fig. 8 is a sectional detail of the lower part of the tank indicated by line 8—8 of Fig. 6;

Fig. 9 is a sectional view of the dump valve, including a diagrammatic showing of the related electrical control assembly;

Fig. 10 is a sectional detail of the electrical control assembly for the dump valve;

Fig. 11 is a sectional detail of another valve, which preferably is associated with the tank, parts being shown in elevation; and Fig. 12 is a diagrammatic view of an electrically operated apparatus of the general character shown in Fig. 1.

Figures 1, 2:
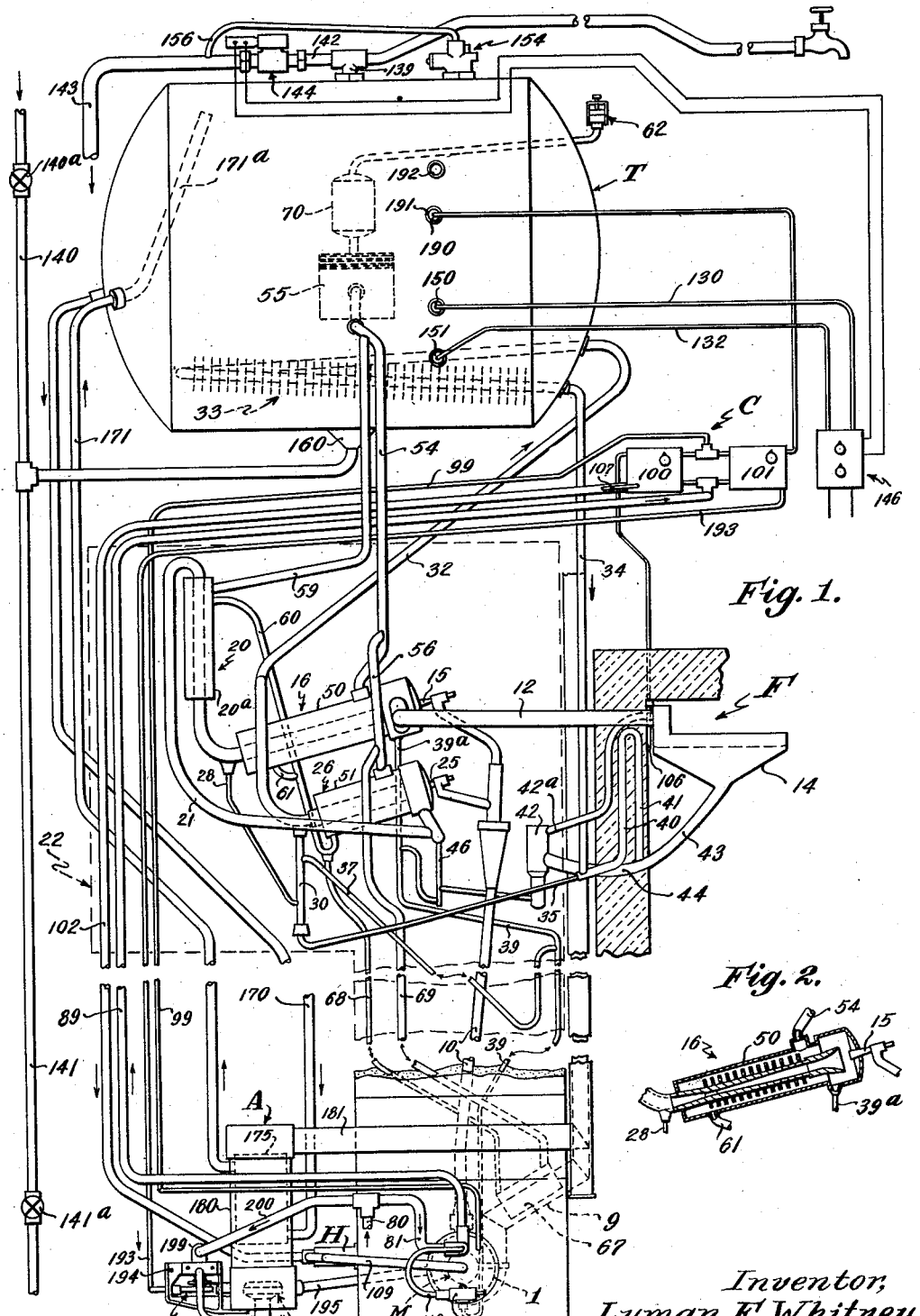
Fig. 1 is a diagrammatic elevational view of a combined water heating and refrigerating apparatus constructed in accordance with this invention, parts being broken away and parts being shown in section.
Fig. 2 is a sectional detail of one of the aspirator assemblies of the device shown in Fig. 1.

The accompanying drawings show a water heating system of preferred form which is combined in a recommended manner with a refrigerating system. First referring to the refrigerating system, which is of the character more fully described and disclosed in the accompanying application of Lyman F. Whitney Serial No. 171,325, filed October 27, 1937, it will be understood that such a system is provided with a boiler 1 which preferably contains mercury and which is heated by a suitable main burner M. This boiler (see Fig. 3) is in the form of a jacket 5 disposed about a fire box which includes an inner combustion passage 7 and an outer convoluted passage 8 communicating therewith, and with a stack 9. A burner and boiler of this general type are disclosed in United States Patents Nos. 1,885,530 and 1,954,398.

The mercury vapor flows upwardly from the boiler 1 through the riser pipe 10 to the first and second stage nozzles 15 and 25, forming parts of first and second stage aspirator assemblies 16 and 26, respectively. The first stage aspirator is effective in drawing refrigerant vapor through the pipe 12 from a body of liquid refrigerant in the cooler 14. Mercury is condensed in the first stage assembly and the resulting condensate passes into the drain 28. Vapor from the first stage assembly passes through an interstage cooler 20 and thence through a duct 21 to the mixing chamber or head of the second stage aspirator assembly, where the mercury vapor from the second stage nozzle 25 is effective in further compressing the refrigerant vapor. Condensed mercury from the second stage assembly is received by the drain 30 which also receives mercury from the drain 28. The compressed refrigerant passes upwardly from the second stage aspirator assembly through the vapor duct 32 to the refrigerant condenser 33 in the water tank T. Condensate from the condenser passes downwardly through a return pipe 34 which communicates at its lower end with an inclined pipe 35 forming one leg of a trap, the opposite leg of which is provided by the lower part of drain 30.

A pipe 37 is connected to the drain 30 and affords a spill-over connection tending to determine the level of mercury in the trap afforded by pipes 30 and 35 and communicating parts of the refrigerating system. The lower part of tube 37 is connected through a trap 38 with a mercury return pipe 39 which contains a head of liquid mercury sufficient to balance the boiler pressure. The upper end of pipe 35 is connected to an upstanding pipe section 40 which extends above the level of the liquid in the cooler 14 to a connection with a downwardly extending pipe 41 that communicates with a duct or drain 43 (preferably of large diameter) extending downwardly from the bottom of the cooler 14.

The lower part of this duct provides a shallow trap 44, and the opposite leg of this trap is connected to a drum 42. This latter is connected by a vapor duct 42ª to the head of the cooler 14.

The lower part of the drum 42 is connected to a drain 46 extending downwardly from the mixing chamber of the second stage aspirator assembly while an upwardly extending pipe connects the lower part of drain 46 with a duct 39ª which forms an upwardly extending continuation of the return duct 39, and which receives condensed mercury from the mixing chamber of the first stage aspirator assembly. Mercury is thus drained from the various parts of the system into the return pipe 39, the lower end of which is connected to the boiler 1.

As fully explained in the above-identified copending application of Lyman F. Whitney, returning refrigerant passes through a mercury trap at the junction of ducts 34 and 40 and thence passes through the upper part of duct 40 and through ducts 41 and 43 to return to the cooler. The various parts of the systems are arranged so that mercury drains from the refrigerant circuit back to the lower mercury-containing part of the system.

In accordance with this invention, the aspirator assemblies 16 and 26 may be provided with jackets 50 and 51 forming part of an auxiliary fluid circuit. This circuit may contain a suitable circulating medium such as alcohol. The temperature of the aspirator funnels is normally higher than that of the refrigerant condenser, and each funnel may be provided with heat-conductive fins as shown in Fig. 2. The jacket 50 is connected to an upwardly extending pipe 54 which communicates with an alcohol condenser 55 at the upper part of the system, while the jacket 51 is connected by a pipe 56 to the pipe 54. These pipes are arranged so that alcohol, which is vaporized by the heat of the condensing mercury in the aspirator assemblies, may pass upwardly into the condenser 55 which is located in the tank T. The interstage cooler 20 is provided with a jacket 20ª which also forms a part of the auxiliary fluid circuit. The upper part of this jacket is connected by a duct 59 to the pipe 54 so that alcohol vapor can also rise from the interstage cooler to the condenser 55. The duct 59 also affords a drain to receive condensate to return the same to the jacket 20ª. A duct 60 directs condensate to the lower part of the jacket 51, the duct 60 being connected by a pipe 61 to the lower part of the first stage alcohol jacket 50.

The auxiliary fluid circuit may include a chamber 67 connected by ducts 68 and 69 to pipes 60 and 56, respectively. The chamber 67 may be of crescent-like cross section and is juxtaposed to the lower part of the stack 9 (Fig. 7) extending upwardly from the boiler of the refrigerating system. Accordingly heat which would otherwise be wasted by the exhaust gases passing into the stack is received by the liquid in chamber 67, some vaporization of this liquid occurring and the vapor passing upwardly through the pipe 69 and ultimately finding its way to the heat dissipator 55 in the water tank.

The alcohol condenser 55 comprises an inclined duct provided with fins and connected to a vapor containing chamber 70 of substantial volume compared to that of the duct. The upper part of the chamber 70 is connected to an evacuating and sealing device 62 located outside of the tank T.

Before operation of the system is started, the secondary circuit is charged with sufficient liquid to fill the lower part of the circuit, including jacket 20ª. This liquid has a normal boiling point which preferably is lower than that of water and which is substantially inert in the presence of the steel walls of the circuit; for example, pure anhydrous ethyl alcohol or ethyl alcohol with a small percentage of acetone preferably may be employed for this purpose. Thereafter air is withdrawn through the connection 62 until the condenser 55 and related parts are substantially free of air and water vapor. Accordingly the effective boiling point of the alcohol or the like is reduced so that the temperature at which heat transfer may take place is correspondingly lowered, while corrosion and consequent generation of non-condensable gases is also avoided. Thus the operating pressure in the auxiliary circuit may be of the order of atmospheric pressure or less. As a result, heat may readily be transferred to dissipator 55, the difference between the temperature of the jackets 50 and 51, and that of the dissipator generally being less than would be the case if the secondary circuit had not been evacuated.

It is evident that the auxiliary fluid circuit just described affords means for conveniently transferring heat to the stored water from the first and second stage aspirator assemblies as well as from the stack 9 and the interstage cooler to the water in tank T.

A system of this character may be evacuated through connections (not shown) and be hermetically sealed so that the absolute pressures within the cooler and condenser are substantially below atmospheric pressure. The cooler may contain an aqueous refrigerant, such as a major portion of water mixed with a minor portion of an antifreeze agent, such as "methyl cellosolve" (monomethyl ether of ethylene glycol) and/or ethylene diamine. The normal operating pressure within the cooler may accordingly be less than 80 mm. of mercury absolute.

Figure 3:
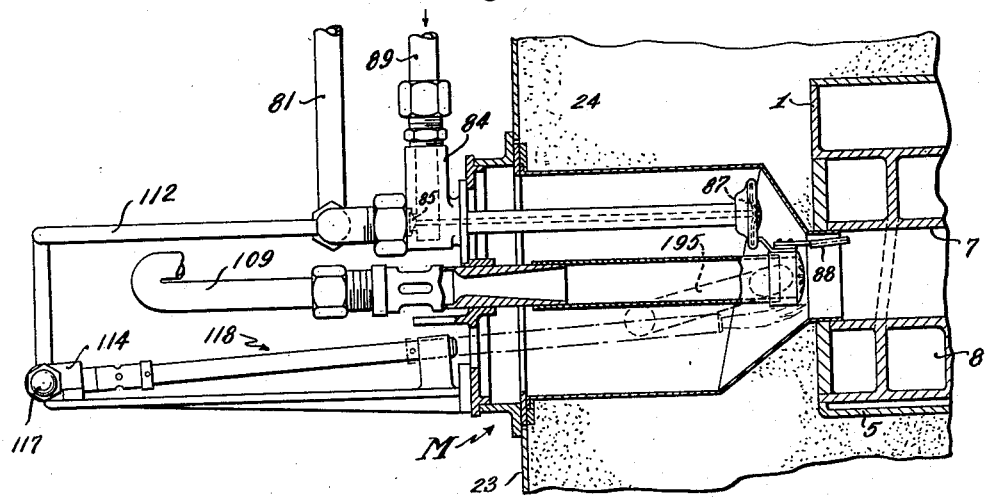
Fig. 3 is a vertical section of a portion of the burner assembly, parts being shown in elevation.
Figure 4:
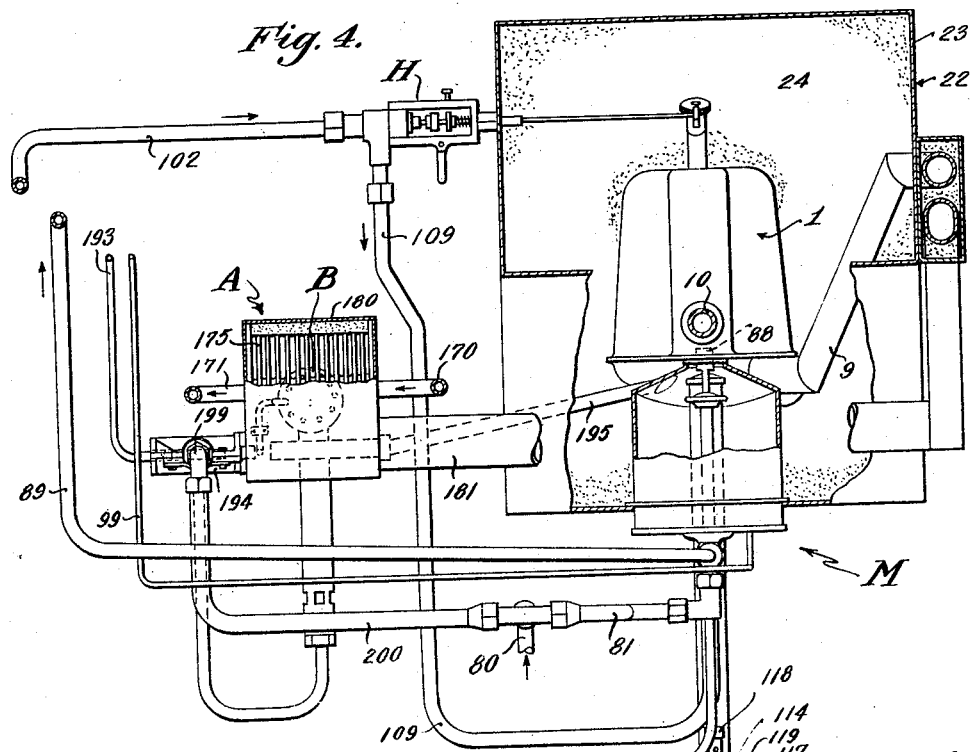
Fig. 4 is a plan view of the burner assembly, parts being broken away and parts being shown in section.

The boiler 1, riser duct 10, economizer 67, aspirator assemblies 16 and 26, the interstage cooler 20, and adjoining portions of the system are located in the insulating housing 22, which may conveniently comprise a sheet metal casing 23 filled with insulating material 24 (Figs. 1, 3 and 4).

Having herein described in general the arrangement of the refrigerating system and its heat dissipating means, I will now refer to the arrangement of the controlling means for this system and to the fuel supplying means therefor.

Fuel such as gas is supplied to the entire apparatus through an inlet pipe 80. This pipe is provided with a branch 81 (Fig. 3) which extends to a valve housing 84 enclosing a suitable valve 85 controlled by a heat-responsive bimetallic disk 87 provided with a heat conductor 88 at the tip of main burner M. When the main burner is operating so that the thermostatic disk 87 is heated and valve 85 thereby kept open, gas may flow from pipe 81 through the valve housing 84 and upwardly through duct 89 to the control assembly C. This assembly C may conveniently be located above the food compartment F which contains the cooler 14 and may be connected by a normally inoperative safety pipe 99 to the housing of burner M, thus to comply with various safety regulations.

The assembly C includes two controllers, the controller 100, which is responsive to the temperature of the interior of the food compartment F and the controller 101 which is responsive to the temperature of the water in the tank T. The upwardly extending pipe 89 is provided with branches to supply gas to each of these controllers. The controller 100 is provided with thermostatic means responsive to the temperature of the food compartment F, such means including the thermostatic bulb 106 within this compartment. Accordingly the flow of gas through the controlling device 100 to its outlet pipe 102 may be automatically varied in accordance with the demand for refrigeration. A suitable by-pass passage 107, however, is afforded to assure the flow of fuel at a minimum rate to the burner M, even when defrosting is taking place. Thus the gas flame of the main burner may keep burning continuously. The lower part of the pipe 102 is connected to a safety shut-off device H which, under all normal operating conditions (unless, for example, the boiler 1 is denuded), permits gas to flow from the lower end of pipe 102 through a pipe 109 to the burner M.

In order to permit convenient lighting of the burner M, a small branch line 112 is connected to the pipe 81 between the pipe 80 and the valve casing 84. The tube 112 communicates with a valve assembly 114 containing a valve controlled by a plunger 117. This plunger is normally held outwardly and the valve is normally held closed by a spring 119 (Fig. 4). When it is desired to start the system and to light the main burner, the plunger is pressed inwardly to permit gas to flow from the tube 112 to the lighter burner 118. The latter is provided with two telescopically arranged burner tubes so that this burner in fact is extensible, the extended part of the burner being shown in its projected position in dotted lines in Fig. 3. Thus an arrangement is provided whereby the main burner may readily be lit, the flame from the lighter burner 118 being sufficient to heat the heat conductor 88 and the thermostatic disk 87 so that gas may flow from the pipe 81 through the pipe 89 to the controller 100, thence through the pipes 102 and 109 to the main burner.

The tank T preferably is formed of metal of low heat conductivity such as a silicon-bronze alloy, and in practice the tank may be encased in a suitable insulating jacket. The tank may be arranged directly above the food compartment F, but in Fig. 1, for purposes of illustration, the tank T is shown at one side of the food compartment F. As previously described, this tank may contain the refrigerant condenser 33 which is arranged in the lower part of the tank and the alcohol condenser 55 which is disposed above the refrigerant condenser and preferably below the mid portion of the tank.

The tank T preferably is provided with curved walls as shown in Figs. 5 and 6. Thus, as shown, the tank may be in the form of a short cylinder provided with outwardly bulged end walls having substantial curvatures, so that in effect the shape of the tank somewhat approaches a spherical form.

The tank T is provided with a supply pipe 140 to receive incoming water from the supply main. This pipe is provided with a downwardly extending branch 141 with a valve 141ᵃ to permit drainage of water from the tank, when desired. The valve 140ᵃ should of course be closed and a faucet opened before the valve 141ᵃ is opened. The upper and normally the hottest part of the tank T is provided with an outlet 139 connected to the pipe for supplying water to the faucets of the house. The outlet 139 is also connected through a short duct 142 to a quick-acting dump valve 144, the latter, when opened, being arranged to emit hot water into a suitable drain 143 which may direct the heated water to a sewer connection. The valve 144 may be of the electromagnetically controlled type and is connected to a control assembly 146 disposed at the side of the tank. The assembly 146 includes switches responsive to the temperature of either one of two heat-responsive bulbs. One of these bulbs 150 is disposed in the tank T substantially on a level with the lower part of the condenser 55, while the other bulb 151 is disposed somewhat below the bulb 150 and substantially on a level with the upper part of the condenser 33.

Fig. 9 shows in greater detail the construction of the dump valve 144 and also diagrammatically illustrates the switch assembly. The valve 144 is provided with an upper casing containing a magnetic coil 120. A tubular plunger 121 is arranged in concentric relation to the coil and is loosely mounted for slidable movement in a tube 123 extending through the coil and downwardly to a point below the same. A valve element 124 is provided with upper and lower spaced collars 126 and 127 for engagement with the upper and lower ends of the tubular plunger 121. When the coil is energized, the plunger 121 is drawn upwardly and obtains a rather high velocity before it engages the upper collar 126, thus quickly lifting the valve 124 away from its seat in the fitting 128 between the pipes 142 and 143, so that water may flow from the pipe 142 to the pipe 143.

When the solenoid 120 is deenergized, the plunger 121 drops downwardly and rests on the collar 127 as the valve element 124 returns to its closed position. This arrangement permits the valve also to close quite abruptly. A valve of this character is particularly advantageous since it opens fully and closes fully almost instantaneously, and does not remain in a slightly opened condition wherein it would merely permit seepage of water out of the tank. A quick opening and quick closing valve of this type, when opened, permits the water to pass at relatively high speed through the valve opening so that the collection of solid particles on the valve seat is effectively prevented and so that there is consequently little likelihood of such particles preventing the complete closing of the valve.

The bulb 150 is connected through a tube 130 with an expansible-contractible bellows 131 and the bulb 151 is connected through a tube 132 with an expansible-contractible bellows 133. The bellows 131 and 133 are arranged in the control assembly 146 as diagrammatically illustrated at the left of Fig. 9, so that when either the bellows 131 or 133 expands in response to a corresponding high temperature of the bulb 150 or 151, either the switch 135 or the switch 136 may be closed. The switches 135 and 136 are connected to a lead 137 extending to one side of the coil 120, while the opposite side of this coil is connected to a lead 137ª adapted to be connected to the electrical current supply line of the house. The opposite side of this line is connected by a lead 139 to the opposite sides of the switches 135 and 136. Accordingly, when either of the switches is closed, the solenoid 120 is energized to cause quick opening of the valve 124.

The assembly 146 is provided with adjustable knobs 138 and 138ª for adjusting the switches 135 and 136, respectively. Accordingly each switch may be independently adjusted to vary the temperature of the corresponding bulb in the tank T at which opening of the dump valve 144 will be effected.

Fig. 10 illustrates the actual structure of the switch assembly 146. This assembly includes a box-like casing having a rear wall 210 on which the bellows 131 and 133 are secured, the assemblies for the respective bellows being similar to each other and the assembly for bellows 131 being more fully shown in Fig. 10. The movable end of the bellows 131 engages a pivotally mounted plate 211 which is engageable with a switch-actuating button 212 on a switch assembly 213. Plate 211 is connected to a tension spring 220. The switch assembly 213 is mounted on a frame 214, one end of which is pivoted on a fixed support and the other end of which is connected to a tension spring 215. A bifurcated snap spring 216 is pinched laterally and is engageable by the inner end of the button 212 and carries the movable contact of the switch 135.

When the bellows 131 expands sufficiently against the action of spring 220, the plate 211 moves toward the button 212 and engages the latter to cause the bifurcated spring 216 to snap so that the switch 135 is closed, whereupon current may pass to the magnetic coil 120. The spring 215 permits the yieldable movement of the switch assembly under such conditions, thus preventing overstraining of any part of this assembly.

The knob 138 is mounted on a threaded spindle 219, having an end portion engaging a part of the frame 214, thus to adjust the normal position of the switch assembly. Obviously as the spindle 219 is screwed inwardly, the opposite end of the frame 214 and the switch assembly are moved away from the bellows and the plate 211, so that a higher temperature is necessary in the tank before the bellows will expand sufficiently to close the switch 135.

The tank T is also provided with a safety valve 154 which is connected to the duct 143 by a tube 156. Fig. 11 illustrates in greater detail the construction of the valve 154. This valve includes a bimetallic disk 230 carrying a valve element 231 normally engaging a suitable seat in the housing of the valve 154. The marginal portion of the disk 230 is mounted between suitably recessed members so that water can flow from the tank about the edge of the valve and into the chamber 232. If the temperature of the water surrounding disk 230 rises to a relatively high point, the disk snaps so that the valve element 231 is moved away from its seat and water may flow through the passage 234 and thence into the outlet duct 156. The device is also provided with a poppet valve 237 which is normally held closed by a spring 238. If the pressure within chamber 232 rises unduly, the poppet valve 237 is moved away from its seat, thus permitting the flow of water from the chamber 232 to the outlet 156. The valve 154 is also provided with a plug 240 having a fusible metal insert 241 arranged so that when the temperature of the fluid in chamber 232 rises to a relatively high point, the fusible material 241 may melt to allow the passage of fluid from the chamber through passages in the plug 240 to the outlet duct 156.

The dump valve 144 may operate either when the temperature of the bulb 150 is above 160° F., e. g., at a temperature of the order of 170° F., or when the bulb 151 is at a temperature above 110° F., e. g., a temperature of the order of 120° F. The valve 144 and the control means therefor are so arranged that hot water is emitted through this valve at a temperature below that which would cause operation of the safety valve 154. Thus under normal operating conditions the dump valve 144 may occasionally operate while the safety valve 154 does not operate except upon some failure of the dump valve 144, such, for example, as a failure of the current supplied to the magnetic coil 120.

The arrangement of the condenser 33 and the heat dissipator 55 at different levels is effective in permitting the water in the lower part of the tank to lie within a warm zone, i. e., a zone which may have a maximum temperature of the order of 120° F., while the water in the upper part of the tank, i. e., the water surrounding the heat dissipator 55 and thereabove, may be in a relatively hot zone, the maximum temperature of which may be of the order of 170° F. Such an arrangement permits the heat from the condenser to raise the temperature of the received water to 120° F., while the high temperature heat dissipator raises the temperature of the water from this point to a substantially higher temperature.

In order to permit the two heating units properly to function in the respective warm and hot zones of the tank in association with the control means in the manner indicated and to avoid overheating of the condenser 33 and consequent inefficient refrigeration while allowing efficient use of heat, the stratification means disclosed herein is particularly advantageous. For this purpose the tank T is provided with a funnel-like connection 160 with the inlet pipe, and suitable perforated disks 161, 162 and 163 are arranged in this funnel-like portion to prevent the passage of water into the tank at high velocity. In order to further assure stratification of the water, a curved deflector plate 165 (Fig. 8) is arranged above the inlet opening.

Water stratification means of this sort prevents the mixing of incoming unheated water with the hot water in the tank, so that there can be a quite sharply defined line between the heated water and the freshly admitted water. Obviously the use of metal of low heat conductivity for the walls of the tank aids in the maintenance of sharp temperature differentials between the hotter and colder layers of water in the tank.

When the temperature of the bulb 150 rises sufficiently to cause actuation of the dump valve 144, the hottest water is emitted from the upper part of the tank and the border layer at the lower edge of the hot zone rises appreciably so that only a relatively small vertical movement of the layer, corresponding to the emission of a small quantity of water, results in the bulb 150 being surrounded by water at a temperature sufficiently low to cause quick closing of the valve 144. Thus an arrangement is provided to cause the dumping of a limited quantity of the hottest water in the tank. For example, this arrangement may result in the dumping of less than 15% of the total amount of water stored in the tank and preferably less than 10% thereof. After the hot water has been dumped in this manner, the remaining hot water is located in the upper part of the tank ready for withdrawal for household use and the stratification means described above prevents any substantial admixture of the unheated incoming water with this remaining hot water. Accordingly after water has been dumped in this manner, there is a hot zone with its rather sharply defined border, below which there is a warm zone, while at the bottom of the tank there is a zone of unheated water provided by the water admitted to the tank from the supply pipe 140.

An auxiliary water heater A is arranged at the lower part of the system rather near the boiler 1 and burner M. Suitable pipes 170 and 171 connect the tank T with this heater A, the return pipe 171 having an upwardly extending continuation 171a with an open end in the upper part of the tank T. The heater may include a finned water chamber 175 contained in a sheet metal casing 180, the upper portion of which communicates with a horizontal vent pipe 181 that extends over to the region of the stack 9 for the main burner 1. These stacks may conveniently be joined at the upper part of the system. The pipe 170 which supplies water to the auxiliary heater A is connected to the lower part of the chamber 175, as shown, and the pipe 171 is connected to the upper part of the same.

Gas is normally prevented from flowing through the controller 101 for the booster burner B which is disposed beneath the member 175. The controller 101 includes a valve responsive to the temperature of a bulb 190 which may be disposed in either one of two sockets 191 and 192 in the side of the tank T, these sockets being spaced vertically from each other and the bulb being selectively located in the desired socket to afford the proper amount of hot water to meet the requirements of the particular household where the system is being used. When the temperature of the water surrounding the bulb 190 falls below a predetermined point, gas flows from the pipe 89 through the controller 101 and the pipe 193 to the pilot burner P for the auxiliary burner B. This pilot burner P is located in a skeletonized casing 194 disposed at one side of the auxiliary heater A and is arranged in substantial alignment with an ignition tube 195 (Fig. 4) extending through the opposite side of the casing 180 to the region of the tip of the main burner M. Accordingly, when gas is permitted to flow to the pilot P, it passes into the ignition tube 195 to the region of the flame at the main burner tip. This gas is ignited and the flame moves backwardly through the tube 195, finally igniting the gas at the tip of the pilot P.

A suitable thermostatic disk is arranged above the pilot P and is associated with a valve disposed in a casing 199 and controlling the flow of gas from a pipe 200 to the booster burner B. This pipe 200 is connected to the main gas supply line 80 at the lower part of the system, as indicated diagrammatically in Fig. 1. Accordingly, when the temperature of the water in the tank falls below a predetermined point, as determined by the thermostatic bulb 190, gas is supplied to the pilot P, this gas being ignited by the main burner M and serving to heat the thermostatic control device which then permits gas to flow to the booster burner B. Both pilot burner P and booster burner B then continue in operation until the flow of gas to the pilot P is interrupted by the controller 101 in response to an increase in the temperature of the water in the tank. Thereupon the flame at the tip of pilot P is extinguished, the thermostatic disk is cooled, the flow of gas through the valve housing 199 is interrupted, and the flame of the booster burner B is also interrupted.

During operation of a system of this character, heat received from burner M passes from dissipator 55 into the stored water in tank T, while additional heat absorbed from the region of evaporator 14 is transferred to the water through condenser 33.

Should refrigeration demand remain substantially constant, but should water surrounding either dissipator increase substantially in temperature, the control device 100 will ordinarily cause more gas to flow to burner M. Under such conditions the system is substantially more sensitive to an increase in the temperature of water surrounding the warm dissipator than to a similar increase in the temperature of water surrounding the high temperature dissipator. In either case more heat may be supplied by the burner M and the temperature differentials between the condensing liquids and the water may be maintained to permit efficient water heating, while the continuing refrigeration demand is met.

If no water is withdrawn during a rather long period, the water temperature reaches a sufficiently high point to cause actuation of the dump valve 144. When this occurs, for example, in response to the high temperature of the bulb 150, the quick-acting valve only emits a minor fraction of the stored water before the bulb 150 is cooled sufficiently to cause quick and complete closing of the valve. Accordingly, under these conditions, less than 15% of the stored water and preferably less than 10% thereof may be emitted from the hot zone. Unheated water is simultaneously admitted through the connection 160 and water which was in the warm zone, i. e., in the region of condenser 33, rises a corresponding amount.

It is evident that immediately after water has been dumped in this manner there is still a very substantial supply of hot water remaining in the tank immediately available for household use. On the other hand, when the temperature of the water in the region surrounding bulb 190 falls below a predetermined point, such as 150° F., the auxiliary heater A will start operating to supply heat at a relatively high rate until the water above the bulb 190 is heated to a point sufficiently high to cause interruption of the operation of the heater A. Thus if the entire supply of hot water is used, the auxiliary heater is effective in a comparatively short time in permitting the provision of a substantial quantity of hot water. After, for example, the water above the bulb 190 has been heated to a temperature such as 150° F. in this manner, the refrigerating system continues to supply heat at a gradual rate.

Since the dump valve 144 preferably does not operate until the major portion of the stored water has a temperature, e. g., 170° F., which is substantially above the temperature usually desirable for household purposes, the apparatus may, under many conditions, provide hot water which may be mixed with unheated water. Obviously a greater amount of water may thus be available at the normally desired temperature than otherwise would be possible without a tank of substantially greater capacity.

The provision of stratification means in association with the inlet for incoming unheated water is particularly advantageous since it substantially prevents the unheated water from mixing with heated water. If the water were thus mixed, the temperature of the refrigerant condenser 33 might be undesirably raised, causing the operation of the dump valve 144 in response to the bulb 151 within a comparatively short time after water had previously been emitted. Furthermore, when the major portion of the hot water has been withdrawn from the tank, the stratification means permits the remaining hot water to be undisturbed in the upper part of the tank ready for withdrawal for household uses rather than mixing with the large body of unheated water which was admitted to replace the previously withdrawn water. The stratification means also prevents the bulb 190 from causing unnecessary operation of the auxiliary heater A which otherwise might result from mixing of the unheated water with the hot water in the tank.

Plate 165 is an important part of the stratification means. Incoming water passes at low velocity under the margins of this plate into the body of stored water.

The principles of the present invention may also be employed with electrically energized heaters. When electric heating means is employed, the heater associated with the boiler of the refrigerating system may conveniently be of the continually operating type. In other words, this heater may be reenergized during frequently recurrent periods. For example, the controller for the heater may have an operating cycle with a length of the order of five minutes or less, the controller normally being effective in closing and opening the circuit for the heater during each cycle, the fraction of each cycle during which energy is supplied to the heater being varied in accordance with the temperature of the food compartment. Under most operating conditions, the intervals between successive periods of energization may be so short that vaporization of propellant in the boiler and operation of the aspirator assembly are both uninterrupted. It is evident that an arrangement of this character affords a continuously operating heater for the hot water storage system, which in effect may afford substantially the same results as obtained from the gas-operated refrigerating system, and that such an arrangement is in distinct contrast to that by a heater which is interrupted for indefinitely long periods of time, so that the refrigerating cycle is also interrupted.

Fig. 12 provides a diagrammatic disclosure of an electrically operated household apparatus including a refrigerating system. For purposes of simplicity of illustration, the system disclosed in Fig. 12 is shown with but a single-stage aspirator, although, in practice, a two-stage aspirator assembly may be employed. This system is provided with a mercury boiler 1' having a riser pipe 10' extending to the aspirator nozzle 15' which forms part of the aspirator assembly 16'. The latter is effective in drawing refrigerant vapor from the cooler 14' through the vapor pipe 12', mercury being condensed in the funnel which receives the mixed vapors and the resulting condensate passing into the duct 28' which contains a column of mercury to balance the boiler pressure. The compressed refrigerant passes upwardly from the aspirator assembly through the vapor duct 32' to the refrigerant condenser 33'. Condensate from the latter flows downwardly through a return pipe 34' which communicates at its lower end with a trap 35', the opposite leg of which is connected to the cooler 14'. A trap 37' is connected to the cooler 14' and to the pipe 28' so that any excess of mercury from the cooler is supplied to the pipe 28' and thus to the boiler 1'.

In accordance with this invention, the aspirator assembly 16' may be provided with a jacket 50' forming part of an auxiliary fluid circuit. This circuit may contain a suitable circulating medium such as alcohol and preferably is evacuated through a sealing connection 62. The auxiliary circuit includes an upwardly extending vapor pipe 54' which communicates with the alcohol condenser 55' at the upper part of the system. The condenser 55' is connected to a condensate return duct 59' extending to the lower part of the jacket 50'.

Electricity may conveniently be received through leads 300 and 301 connected to the source of house current supply or the like. The lead 300 is provided with a branch 302 connected to one side of the heating unit 303 for the boiler 1', while the opposite side of this heating unit is connected to a lead 304 extending to a chronometric control assembly 305. This assembly is arranged to cause the energization of the heating unit 303 in frequently recurrent cycles. For this purpose the device may include an electrically operated clock mechanism 307 which drives a cam 308, each revolution of which provides an operating cycle. The latter may have a length of less than five minutes and preferably may be of the order of three minutes.

The cam 308 is engageable with a follower carried by a resilient arm of a switch 309, the cam being arranged so that the switch is closed for a fraction of each cycle corresponding to each revolution of the cam and open for the remainder of the cycle. The switch 309 is mounted on a pivotally supported arm 310. A heat expansible bellows 314 is disposed between this arm and the end of a pivoted support 312. A heavy tension spring 311 holds the bellows against the arm 312. The bellows is connected to a thermostatic bulb 315 in the region of the cooler 14'. Accordingly, when the temperature of the cooler increases, the bellows 314 expands to move the support 310 away from cam 308 so that the latter is effective in opening the switch for a smaller fraction of each cycle. Current may thus be supplied to heater 303 for a greater fraction of the elapsing time so that the rate of refrigeration is increased. The eccentric 313 which engages the support 312 may be adjusted to vary the effect of the bellows 314 on the assembly. The lead 304, extending from the heater 303, is electrically connected to the lead 320 each time that the switch 309 is closed. The lead 320 is connected to the lead 301, thus completing the circuit through the control assembly 305 and heater 303. The clock 307 is connected across the line, i. e., to the leads 301 and 300 through leads 333 and 334, respectively.

The leads 300 and 301 may also be operatively connected to the electrically actuated dump valve 144' and the control assembly 146' for the tank T'. The arrangement of the dump valve and control assembly may be similar to that previously described, and parts of the assembly are identified by reference characters similar to those in Fig. 9. It is evident that the valve 144' is connected to the lead 301 by a lead 342, that a lead 346 connects the valve 144' and the control assembly 146', and that the control assembly in turn is connected to the lead 300.

In order to supply additional heat to the water storage system when a relatively large amount of water has been withdrawn from the tank, suitable auxiliary electrically energizable heating means is provided. This means may conveniently be in the form of two electric heaters arranged at different levels. Thus one of the heaters 340 may be located in the upper part of the tank T' while the other heater 341 may be located slightly above the mid-portion of the tank. Both of these heaters may be connected through a lead 342 to the lead 301, while the other side of the heater 340 may be connected through a lead 343 to a control device 344. A bulb 190' extends into the upper portion of the tank and is connected to the bellows 346, the controller 344 being arranged so that a circuit is closed between lead 343 and a lead 347 connected to the lead 300, when the temperature of the water in the region of the bulb falls below a predetermined point, such as 150° F.

The heater 341 may be similarly associated with a lead 352 connected to a control device 345, it being evident that the device 345 is effective in closing the circuit between leads 352 and 347 when the temperature of bulb 190" falls below a predetermined point. The device 344 and 345 are provided with manual adjustments 354 and 355, respectively, to vary the effect of the expansible-contractible bellows upon the circuit-closing means. It is thus evident that the heater 341 may be energized if a moderate amount of auxiliary heat is required in the tank, while both heaters may be energized if a greater quantity of heat is required, for example, after a large quantity of water has been drawn from the tank.

It is evident that the refrigerating system shown in Fig. 12 operates in the general manner described with reference to the refrigerating system shown in Fig. 1, and that heat from the aspirator assembly 16' causes vaporization of the fluid, such as alcohol, in jacket 50', so that the resulting vapor upon condensing in condenser 55' gives up heat to the hot zone in the upper part of tank T'. It is also evident that the warm dissipator 33' gives up heat to the water in a warm zone at the lower part of the tank T'. If the temperature of the water in the hot zone becomes too high, the dump valve 144' is actuated through the controller 146' to cause dumping of a limited quantity of water. Similarly, if the temperature in the warm zone becomes too high, the dump valve 144' is actuated by this controller to cause dumping of water. If the temperature adjoining the bulbs 190' and 190" becomes too low, the heaters 340 and 341 are energized to supply additional heat to the tank T'.

It is evident that the present invention affords apparatus which has very high efficiency as a water heater and which also may be employed to provide automatically controlled refrigeration.

It should be understood that the present disclosure is for the purpose of illustration only and that this invention includes all modifications and equivalents which fall within the scope of the appended claims.

I claim:

1. Combined refrigerating and water heating apparatus comprising a refrigerating system, a water tank, said system including a refrigerant circuit including a refrigerant condenser, a cooler and a high temperature part through which the refrigerant circulates, said part being below the condenser and normally having a temperature higher than that of the condenser, said condenser being in heat transfer relation to water in the lower part of said tank, and a closed auxiliary fluid circuit having a heat-receiving lower portion in heat transfer relation to said part and a heat dissipating portion in heat transfer relation to water in said tank above the lower part thereof.

2. Combined refrigerating and water heating apparatus comprising a refrigerating system including a refrigerant circuit including a cooler and a heat emitting part through which refrigerant circulates, said system also including a burner imparting energy to the apparatus, a stack receiving hot gases from said burner, a water tank, and a closed secondary fluid circuit receiving heat from a portion of said stack adjoining the burner and said part, and from transmitting the heat to said tank.

3. Combined refrigerating and water heating apparatus comprising a refrigerating system including a refrigerant circuit including a condenser and a cooler, said system also including a burner imparting energy to the apparatus, a stack receiving hot gases from said burner, a water tank, and an auxiliary fluid circuit including a vaporizer at the lower part of the apparatus receiving heat from a portion of said stack adjoining the burner and a condenser transmitting heat to water in said tank.

4. Combined refrigerating and water heating apparatus comprising a refrigerating system including a refrigerant circuit including a cooler and a heat emitting part through which refrigerant circulates, said system also including a burner imparting energy to the apparatus, a water tank, and an auxiliary fluid circuit receiving heat from said part and transmitting the same to the tank, said burner being located at the lower part of the apparatus, and an auxiliary heater also located at the lower part of the apparatus, and a fluid circuit between said heater and tank to transmit heat therebetween.

5. Unitary refrigerating and water heating apparatus comprising a water tank, a refrigerating system including a refrigerant circuit having a refrigerant condenser and a cooler through which refrigerant circulates, said system also including a propellant circuit including a vaporizer and a part in common with the refrigerant circuit where propellant vapor entrains and pumps refrigerant vapor, said condenser being in direct heat transfer relation with the water in the lower part of said tank, and a closed auxiliary circuit having a heat-receiving portion in heat transfer relation to said common part and a heat dissipating portion in heat transfer relation to water in said tank above said condenser.

6. Combined refrigerating and water heating apparatus comprising a refrigerating system, a water storage system, said refrigerating system including a refrigerant circuit having a heat emitting part through which the refrigerant circulates, a closed auxiliary fluid circuit having a heat-receiving portion in heat transfer relation to said part and having a heat dissipator in heat transfer relation to water in said storage system, a dump valve for said storage system, and a thermostatic control arranged to cause automatic actuation of said valve, said control being responsive to the temperature of the water in the region of the dissipator.

7. Combined refrigerating and water heating apparatus comprising a refrigerating system, a water storage system, said refrigerating system including a refrigerant circuit having a heat emitting part through which the refrigerant circulates, a closed auxiliary fluid circuit having a heat-receiving portion in heat transfer relation to said part and having a heat dissipator in heat transfer relation to water in said storage system, a dump valve for said storage system, and a thermostatic control arranged to cause automatic actuation of said valve, said control being responsive to the temperature of the water in the region of the dissipator, said valve being of the quick-acting, magnetically operated type.

8. Combined refrigerating and water heating apparatus comprising a refrigerating system, a water tank, said system including a refrigerant circuit including a refrigerant condenser, a cooler and a high temperature part through which the refrigerant circulates, said part being below the condenser and normally having a temperature higher than that of the condenser, said condenser being in heat transfer relation to water in the lower part of said tank, and an auxiliary fluid circuit having a heat-receiving lower portion in heat transfer relation to said part and a heat-dissipating portion in heat transfer relation to water in said tank above said condenser, and a dump valve for said tank, two thermostatic controls arranged to cause automatic actuation of said valve, one of said controls being responsive to the temperature of the water in the region of the condenser, the other control being responsive to the temperature of the water in the region of said heat-dissipating portion.

9. Combined refrigerating and water heating apparatus comprising a water storage system and a refrigerating system, said apparatus including a warm heat-dissipating part and a hot heat-dissipating part both in heat transfer relation to the water in said storage system, an outlet duct connected to said storage system, a dump valve associated with said duct and controlling the flow of water therethrough, and two thermostatic controls arranged to cause automatic actuation of said valve in response to an increase in water temperature, one of said controls being actuable in response to an increase in the temperature of water in the region of the warm heat-dissipating part and the other of said controls being responsive to the temperature of water in the region of the hot-dissipating part.

10. Combined refrigerating and water heating apparatus comprising a refrigerating system including a warm heat dissipator and a hot heat dissipator, a water storage system arranged with the warm dissipator in heat transfer relation to the water in the lower part of the system and the hot dissipator in heat transfer relation to water thereabove, the storage system being provided with an inlet for unheated water, the storage system being arranged so that water in the upper part of the system may be disposed in a hot zone with a rather sharply defined lower border, and water-emitting means for preventing overheating of the water in the region of either of said dissipators, said means being arranged so that hot water is emitted from the tank when the temperature in the region of the hot dissipator rises above a predetermined point, said means also being arranged so that unheated water is admitted to the region of the warm dissipator when the temperature of that region exceeds a lower predetermined temperature.

11. Combined refrigerating and water heating apparatus comprising a water tank, a circuit for a volatile fluid including a vaporizer and a condenser in direct heat transfer relation to said tank, means for vaporizing the fluid in said vaporizer, said circuit being arranged so that vapor passes from the vaporizer to the condenser and condensed liquid returns from the condenser to the vaporizer, and means associated with the said tank for emitting less than 15% of the water stored in said tank when water in the tank reaches a predetermined temperature.

12. Water heating appliance comprising a source of heat, a water tank arranged to be heated from said source, a dump valve associated with an outlet for an upper portion of said tank, a quick-acting control device for said valve, said tank and source of heat being constructed and arranged so that hot water collects in a hot zone in the upper part of the tank, said zone having a relatively sharply defined lower border, said device including a thermostatic element responsive to a high temperature of the lower part of said zone to cause quick opening of the valve, said device operating to shut the valve when said border rises slightly due to the emission of a relatively small quantity of water through said outlet.

13. Water heating appliance comprising a tank, a quick acting dump valve associated with an upper portion of said tank, a control device for said valve including temperature responsive means operable in response to the temperature of a water layer spaced substantially below the upper part of said tank, said tank being provided with an inlet for supplying incoming water to the lower part of the tank, an outlet duct for receiving heated water from the upper part of the tank, said tank being provided with means associated with the inlet duct to prevent incoming water from rising to mix substantially with hot water in the upper part of the tank, said tank also being formed of metal of relatively low heating conductivity in order to enhance stratification of the water in rather clearly defined layers of different temperatures.

14. Combined refrigerating and water heating apparatus comprising a refrigerating system and a water tank receiving heat from said system, said system including a continually operating heater for heating water in said tank, a duct to supply water from said tank, a dump valve for emitting water from said tank when the temperature of contained water rises above a predetermined point, temperature-responsive means controlling said valve and effective to cause quick opening and quick closing of the valve, said means being arranged so that only a minor fraction of the water is emitted from the upper part of said tank, said tank having an inlet for supplying unheated water to the lower part thereof, the tank being constructed and arranged so that mixture of the unheated water in the lower part of the tank and heated water in the upper part of the tank is impeded and so that transfer of heat between the upper and lower parts of the tank is also impeded, and a safety valve operable to cause emission of water from the upper part of the tank when the temperature therein exceeds a temperature which would normally result in the opening of said dump valve.

15. Water heating apparatus comprising a water tank having an inlet connection, means associated with said connection for impeding the mixture of incoming unheated water with hot water in the upper part of said tank, a circuit for a volatile fluid including a vaporizer below said tank and a condenser in direct heat transfer relation to said tank, means for vaporizing the fluid in said vaporizer, said circuit being arranged so that vapor passes from the vaporizer to the condenser and condensed liquid returns from the condenser to the vaporizer, a dump valve for emitting water from said tank and a temperature-responsive element in the region of said condenser for actuating the dump valve when the temperature of the region adjoining said element reaches a predetermined point.

16. Combined refrigerating and water heating apparatus comprising a refrigerating system, a water storage system, said refrigerating system being provided with a heat dissipator in heat transfer relation to water in the storage system, said storage system being provided with an inlet connection for incoming unheated water, means associated with said connection for impeding the mixture of the incoming water with heated water above the connection, a dump valve for emitting water from said system, control means for opening and closing said valve, said last-named means automatically causing the valve to emit less than 15% of the water stored in the storage system in response to the increase of water temperature to a predetermined point.

17. Water heating appliance comprising a water tank, a source of heat therefor, an inlet duct including a connection with the lower part of the tank, said connection being flared to have its portion of major cross section in the region of the juncture of the tank and duct and a deflector plate within the tank and spaced slightly from the wall thereof, said plate extending over the end of the said duct and cooperating with the connection in providing means to impede mixture of incoming water with water in the upper part of the tank.

18. Combined refrigerating and water heating apparatus comprising a refrigerating system, a water tank, said system having a high temperature part from which heat is directed to water in said tank, an inlet duct having a connection with said tank and means associated with said connection to impede the rapid flow of incoming water into said tank thereby to prevent the substantial mixture of unheated incoming water with hot water remaining in said tank.

19. Combined refrigerating and water heating apparatus comprising a tank having an inlet connection, means associated with said connection for impeding the mixture of incoming unheated water with hot water in the upper part of said tank, a circuit for a volatile fluid including a vaporizer and a condenser in heat transfer relation to said tank, and means for vaporizing the fluid in said vaporizer, said circuit being arranged so that vapor passes from the vaporizer to the condenser and condensed liquid returns from the condenser to the vaporizer.

20. Combined refrigerating and water heating apparatus comprising a water tank having an inlet connection, means associated with said connection for impeding mixture of incoming unheated water with hot water in the upper part of the tank, a circuit for volatile fluid including a vaporizer and a condenser in heat transfer relation to said tank, means for vaporizing the fluid in said vaporizer, said circuit being arranged so that vapor passes from the vaporizer to the condenser and condensed liquid returns from the condenser to the vaporizer, and means for emitting less than 15% of the stored water from the tank when the temperature of the water in the tank reaches a predetermined point.

21. Combined refrigerating and water heating apparatus comprising a refrigerating system, a water tank, said system including a refrigerant circuit having a heat emitting part through which the refrigerant circulates, a closed auxiliary fluid circuit having a vaporizer in heat transfer relation to said part and having a condenser in heat transfer relation to water in said tank, said vaporizer containing a body of liquid having a normal boiling point below the normal boiling point of water and which is substantially inert relative to the walls of said auxiliary circuit.

22. Combined refrigerating and water heating apparatus comprising a refrigerating system, a water tank, said system including a refrigerant circuit having a heat emitting part through which the refrigerant circulates, a closed auxiliary fluid circuit having a vaporizer in heat transfer relation to said part and having a condenser in heat transfer relation to the water in said tank, and a body of non-aqueous liquid in said vaporizer, said liquid having a normal boiling point below the normal boiling point of water, said auxiliary circuit being evacuated to remove substantially all air and water vapor therefrom, the circuit being arranged so that the operating pressure therein may normally be of the order of atmospheric pressure or less.

23. Combined refrigerating and water-heating apparatus comprising a refrigerating system, a water tank, said system including a refrigerating circuit having a heat emitting part through which the refrigerant circulates, a closed auxiliary fluid circuit having a vaporizer in heat transfer relation to said part and having a condenser in heat transfer relation to water in said tank, said vaporizer containing a body of liquid, said auxiliary circuit being substantially evacuated of air.

24. Combined refrigerating and water heating apparatus comprising a refrigerating system and a water storage system, the refrigerating system comprising a heater and a refrigerant circuit, said circuit including a cooler and two heat emitting portions in heat transfer relation to water in the storage system, one of said portions emitting heat absorbed by the cooler, the other of said portions emitting heat received from the heater, a control instrumentality responsive to the temperature of the region of the cooler and automatically controlling the operation of the heater so that the temperature of the cooler tends to be maintained at a desired point despite variations in temperature of the stored water, each of said portions being capable of increasing in temperature in response to an increase in the temperature of water receiving heat therefrom, whereby adequate temperature differentials are obtained between the said heat emitting portions and the water receiving heat therefrom, the amount of heat supplied by the heater ordinarily increasing or decreasing in response to a substantial increase or decrease in the temperature of water in heat transfer relation to one of said portions, even while refrigeration demand remains constant, a dump valve associated with the storage system, and a temperature-responsive control therefor arranged to cause the opening of the valve to emit only a minor fraction of the stored water when the temperature of stored water rises to a predetermined point.

25. Combined refrigerating and water heating apparatus comprising a refrigerating system and a water heating system, the refrigerating system comprising a heater and a refrigerant circuit, said circuit including a cooler and being provided with a high temperature heat dissipator and a warm dissipator, said dissipators being mutually spaced and being in heat transfer relation to water in the storage system, the high temperature dissipator being capable of providing a temperature substantially above 150° F., a control instrumentality responsive to the temperature of the region of the cooler and automatically controlling the operation of the heater so that the temperature of the cooler tends to be maintained at a desired point despite variations in the temperature of the stored water, the amount of heat supplied by the heater and the temperatures of both dissipators tending to increase or to decrease in response to a substantial increase or decrease in the temperature of the water in heat transfer relation to either of said dissipators, variations in the amount of heat supplied by the heater being substantially less in response to variations in the temperature of the water in heat transfer relation to the high temperature dissipator than in response to variations in temperature of the water in heat transfer relation to the warm dissipator, a dump valve associated with the storage system, and a temperature-responsive control therefor arranged to cause the opening of the valve to emit only a minor fraction of the stored water when the temperature of stored water rises to a predetermined point.

26. Combined refrigerating and water heating apparatus comprising a refrigerating system and a water storage system, the refrigerating system comprising a heater and a refrigerant circuit, said circuit including a cooler and two heat emitting portions in heat transfer relation to water in the storage system, one of said portions emitting heat absorbed by the cooler, the other of said portions emitting heat received from the heater, a control instrumentality responsive to the temperature of the region of the cooler and automatically controlling the operation of the heater so that the temperature of the cooler tends to be maintained at a desired point despite variations in temperature of the stored water, each of said portions being capable of increasing in temperature in response to an increase in the temperature of water receiving heat therefrom, whereby adequate temperature differentials are obtained between the said heat emitting portions and the water receiving heat therefrom, the amount of heat supplied by the heater ordinarily increasing or decreasing in response to a substantial increase or decrease in the temperature of water in heat transfer relation to one of said portions, even while refrigeration demand remains constant, a dump valve associated with the storage system, a temperature-responsive control therefor arranged to cause the opening of the valve to emit only a minor fraction of the stored water when the temperature of stored water rises to a predetermined point, an auxiliary heater for supplying additional heat to the stored water, and control means causing operation of said heater when the temperature of stored water falls below a predetermined point.

27. Method of conjointly producing refrigeration and heating water comprising circulating fluid in a closed cycle to absorb heat from a region to be cooled, heating fluid in one part of the cycle to a temperature of at least 150° F., in another portion of the cycle transferring heat thus received by the fluid to water stored for household use, and in still another portion of the cycle transferring heat absorbed from said region to said water, varying the heat supplied to the fluid in said part of the cycle to increase the temperature of fluid in one of the heat transferring portions of the cycle in response to an increase in the temperature of the stored water so that heat may readily be transferred from the last named portion of the cycle to the water, while simultaneously causing the absorption of heat from said region at a rate tending to maintain the temperature of the region at a substantially constant average temperature.

28. Combined refrigerating and water heating apparatus comprising a refrigerating system and a water heating system, the refrigerating system comprising a heater and a refrigerant circuit, said circuit including a cooler and first and second heat emitting portions, said portions being in heat transfer relation to water in the storage system, the first portion emitting heat received from said heater, the second portion emitting heat absorbed from the region of the cooler, a control instrumentality responsive to the temperature of the region of the cooler and automatically controlling the operation of the heater so that the temperature of the cooler tends to be maintained at a desired point despite variations in the temperature of the stored water, the amount of heat supplied by the heater and the temperature of the second heat emitting portion tending to increase or to decrease in response to substantial increase or decrease in the temperature of the water in heat transfer relation to said second portion, a dump valve associated with the storage system, and a temperature-responsive control therefor arranged to cause the opening of the valve to emit only a minor fraction of the stored water when the temperature of the stored water rises to a predetermined point.

29. Combined refrigerating and water heating apparatus comprising a refrigerating system and a water heating system, the refrigerating system comprising a heater and a refrigerant circuit, said circuit including a cooler and being provided with a first heat dissipator and a second heat dissipator, said dissipators being mutually spaced and being in heat transfer relation to water in the storage system, the first dissipator emitting heat received from the heater, the second dissipator emitting heat absorbed by the cooler, a control instrumentality responsive to the temperature of the region of the cooler and automatically controlling the operation of the heater so that the temperature of the cooler tends to be maintained at a desired point despite variations in the temperature of the stored water, and means for preventing the temperature of water receiving heat from the second dissipator from rising above a predetermined point, each of said dissipators being capable of increasing in temperature in response to the temperature of water receiving heat therefrom, whereby adequate temperature differentials are obtained between said dissipators and water receiving heat therefrom, the amount of heat supplied by the heater ordinarily increasing or decreasing in response to a substantial increase or decrease in the temperature of water receiving heat from said second dissipator.

30. Combined refrigerating and water heating apparatus comprising a refrigerating system and a water heating system, the refrigerating system comprising a heater and a refrigerant circuit, said circuit including a cooler and being provided with a first heat dissipator and a second heat dissipator, said dissipators being mutually spaced and being in heat transfer relation to water in the storage system, the first dissipator emitting heat received from the heater, the second dissipator emitting heat absorbed by the cooler, and control means tending to maintain the temperature of the cooler at a desired point and limiting the temperature of water receiving heat from said second dissipator, said control means controlling the operation of the heater so that the amount of heat supplied by the heater may increase or decrease in response to a substantial increase or decrease in the temperature of water receiving heat from said second dissipator, even while refrigeration demand remains constant.

31. Combined refrigerating and water heating apparatus comprising a refrigerating system, a water tank, said system including a medium temperature part and a high temperature part, said medium temperature part being disposed in heat transfer relation to the lower part of said tank, and a closed auxiliary fluid circuit having a heat-receiving lower portion in heat transfer relation to said high temperature part, and a heat dissipating upper portion in heat transfer relation to water in said tank above the lower part thereof.

32. Combined refrigerating and water heating apparatus comprising a refrigerating system, a water tank, said refrigerating system including a refrigerant circuit having a heat emitting portion through which the refrigerant circulates, an auxiliary fluid circuit including a vaporizer in heat transfer relation to said heat emitting part and a condenser in heat transfer relation to said water tank, said auxiliary circuit being arranged so that vapor passes from the vaporizer to the condenser and condensed liquid returns from the condenser to the vaporizer, and means associated with said tank for emitting only a minor fraction of the stored water when the water in the tank reaches a predetermined temperature.

LYMAN F. WHITNEY.